United States Patent
Fujita et al.

(10) Patent No.: US 8,554,511 B2
(45) Date of Patent: Oct. 8, 2013

(54) APPARATUS, METHOD AND PROGRAM FOR VEHICLE MASS ESTIMATION

(75) Inventors: Hajime Fujita, Nishinomiya (JP); Mitsuhiro Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 374 days.

(21) Appl. No.: 12/912,293

(22) Filed: Oct. 26, 2010

(65) Prior Publication Data

US 2011/0218764 A1 Sep. 8, 2011

(30) Foreign Application Priority Data

Mar. 3, 2010 (JP) ................................ 2010-046823

(51) Int. Cl.
*G01G 1/18* (2006.01)
*G01G 1/20* (2006.01)
*G06F 3/01* (2006.01)
*G06F 3/02* (2006.01)

(52) U.S. Cl.
USPC ............ 702/175; 702/173; 702/179; 702/181

(58) Field of Classification Search
USPC ............... 702/33, 37, 63, 142, 145, 173, 175, 702/179, 181; 73/121; 280/5.507; 701/51
See application file for complete search history.

(56) References Cited

U.S. PATENT DOCUMENTS

| | | | | |
|---|---|---|---|---|
| 5,897,130 A | * | 4/1999 | Majeed et al. | 280/5.507 |
| 6,347,269 B1 | * | 2/2002 | Hayakawa et al. | 701/51 |
| 6,427,528 B1 | * | 8/2002 | Yamakado et al. | 73/121 |
| 7,171,296 B2 | * | 1/2007 | Kato et al. | 701/70 |
| 2005/0096830 A1 | * | 5/2005 | Ohta et al. | 701/91 |

FOREIGN PATENT DOCUMENTS

| | | |
|---|---|---|
| JP | 2007-45295 A | 2/2007 |
| JP | 2009-40080 A | 2/2009 |
| WO | WO 03/023334 A1 | 3/2003 |

OTHER PUBLICATIONS

Ting et al., "Learning an Outlier-Robust Kalman Filter", European Conference on Machine Learning (ECML 2007) pp. 748-756.
Extended European Search Report dated Jul. 18, 2011, for European Application No. 10013412.1.

* cited by examiner

*Primary Examiner* — Marc Armand
*Assistant Examiner* — Felix Suarez
(74) *Attorney, Agent, or Firm* — Birch, Stewart, Kolasch & Birch, LLP

(57) ABSTRACT

An apparatus, method and program for estimating the mass of a vehicle uses periodically detected tire rotation speed information of the vehicle wheels, calculated tire rotation acceleration information, calculated driving force of the vehicle, and estimated mass of the vehicle as a regression coefficient when the rotation acceleration information and the driving force information are subjected to linear regression. With regard to an error in calculated driving force information, a ratio is calculated between the dispersion of the error obtained one time before and an error at the current moment, and an update adjustment parameter is calculated by adding a stabilization parameter to thus obtained ratio. The calculated update adjustment parameter is used to calculate a Kalman gain so that the mass is sequentially estimated so as to reduce an update width of the regression coefficient when the error ratio is higher.

3 Claims, 4 Drawing Sheets

APPARATUS, METHOD AND PROGRAM FOR VEHICLE MASS ESTIMATION

TECHNICAL FIELD

The present invention relates to an apparatus, a method and a program for vehicle mass estimation used to improve the detection accuracy of a detection apparatus for detecting a tire having a decreased pneumatic pressure based on a tire dynamic loaded radius.

BACKGROUND ART

Factors for allowing an automobile to run safely can include a tire pneumatic pressure. A pneumatic pressure lower than an appropriate value may deteriorate a stable operation or fuel consumption to thereby cause a tire burst. Thus, a tire pressure monitoring system (TPMS) for detecting a decreased tire pneumatic pressure to issue an alarm to a driver to prompt an appropriate procedure is an important technique from the viewpoints of environment protection and driver safety.

Conventional alarm apparatuses can be classified into a direct detection type (direct TPMS) and an indirect detection type (indirect TPMS). The direct TPMS includes a pressure sensor provided in a tire wheel to directly measure a tire pneumatic pressure. This direct TPMS can accurately detect a decreased pneumatic pressure. The direct TPMS on the other hand requires exclusive wheels and is involved with a disadvantageous fault tolerance performance in an actual environment, thus leaving technical and cost disadvantages.

On the other hand, the indirect TPMS uses a method to estimate a pneumatic pressure based on rotation information of tires. The indirect TPMS can be further classified into a dynamic loaded radius (DLR) type, a resonance frequency mechanism (RFM) type, and a global positioning system (GPS) type for example. Among them, the DLR type apparatus used in the present invention uses a phenomenon in which a tire rolling under a load has a reduced tire radius (dynamic loaded radius) due to a decreased pressure and thus is rotated at a higher speed than a tire having a normal pressure. Thus, the DLR type apparatus makes a relative comparison among the rotation speeds of four tires to thereby detect a decreased pressure. Since the DLR type apparatus can subject only the wheel rotation speed signals obtained from wheel speed sensors to a relatively-simple calculation processing, the DLR type apparatus has been widely researched mainly for the purpose of detecting the puncture of one wheel.

In the case of the DLR method however, a difference in a wheel speed may be caused also by general running conditions such as a vehicle turning or acceleration and deceleration. Thus, the DLR method has a disadvantage that a decreased pressure cannot be accurately detected through all running statuses. For example, when a vehicle turns to the left, the entire vehicle is inclined downwardly to right side due to the centrifugal force. Thus, the right wheels have reduced dynamic loaded radii, which causes a false alarm.

In order to avoid the disadvantages as described above, Patent Literature 1 for example uses a processing for example according to which information obtained from sensors is not used as data to determine a decreased pressure in cases other than a reference running condition where the vehicle is running straight on a flat road at a fixed speed (e.g., a case where acceleration applied to the vehicle in a front-and-rear direction or in a lateral direction is equal to or higher than a predetermined value).

The tire radius also changes depending on the weight of a person in the vehicle, the number of passengers therein, the weight of baggage, or the place where the baggage is placed. Rear wheel tires in particular bear a significantly-fluctuated load since heavy baggage is frequently placed in the trunk. This is disadvantageous when comparison is made between two front wheels and two rear wheels. Thus, in order to improve the estimation accuracy of an alarm system for a tire having a decreased pneumatic pressure based on the DLR method, there is required a processing to correct a decreased pressure determination value based on information regarding a vehicle mass, for example.

Known methods for obtaining a load of a running vehicle include a method of attaching a load sensor to the vehicle to measure a load provided in the vehicle and a method of converting a suspension stroke amount or a change amount of a vehicle height to a load. However, the direct methods as described above require an additional measurement apparatus or a special vehicle structure. Thus, these methods cannot be realized in a general vehicle due to technical and cost reasons.

There may be considered another method that does not require a special sensor for example in the vehicle and that estimates the load status of the vehicle. Specifically, there is provided a method of obtaining a vehicle acceleration a or signals of torques F applied to the respective wheels from a wheel speed sensor provided in an anti-lock braking system (ABS) to use the relation of the motion equation F=ma to calculate the vehicle mass $\underline{m}$ as an inclination when a and F are subjected to linear regression (Japanese Patent Application No. 2009-097882 filed by the present applicant). When the vehicle contact area has a gradient, an influence by the gravity is a problem. To solve this, there has been known a method to correct an estimation value based on the gradient information obtained from a gyro sensor or GPS (see Patent Literature 2 for example).

The method as described above can estimate the vehicle mass at a certain level of accuracy and with a low cost. Thus, this method has been used as an ancillary technology for an alarm system for a tire having a decreased pneumatic pressure based on the DLR. However, this method had disadvantages as described below. Specifically, in order to process the linear regression in a real-time manner, a regression coefficient has been conventionally calculated by a Kalman filter (iterative least squares technique). However, this algorithm assumes white data and thus is not always robust to a colored outlier observed suddenly. Thus, an estimation value may be unstable depending on the running conditions. Furthermore, when an outlier occurs frequently, a delay is caused in the convergence of estimation values. To prevent this, such data that is expected to have an adverse effect on the current estimation value must be subjected to an adaptive processing to assume such data as an outlier to thereby reject the data for example. This method is generally called a "robust Kalman filter" for which a status estimation method has been suggested according to which robustness to outliers is improved by incorporating previous knowledge derived from a gamma distribution into calculation of a Kalman gain for example (see Non-Patent Literature 1 for example).

CITATION LIST

Patent Literature

Patent Literature 1: Japanese Unexamined Patent Publication No. 2007-45295

Patent Literature 2: Japanese Unexamined Patent Publication No. 2009-40080

Non-Patent Literature

Non-Patent Literature 1: Ting, J.; Theodorou, E.; Schaal, S., "Learning an Outlier-Robust Kalman Filter", European Conference on Machine Learning 9 (ECML2007), pp 748-756, Springer

SUMMARY OF INVENTION

Technical Problem

The present invention has been made in view of the situation as described above. It is an objective of the present invention to provide an apparatus, a method and a program for vehicle mass estimation by which the mass of a running vehicle can be accurately estimated only based on a wheel speed signal.

Solution to Problem

In accordance with a first aspect of the present invention, there is provided a vehicle mass estimation apparatus for estimating the mass of a vehicle based on rotation information of tires attached to the vehicle, comprising:

a rotation speed information detection means for periodically detecting tire rotation speed information of the respective wheels of the vehicle;

a rotation acceleration information calculation means for calculating tire rotation acceleration information based on the rotation speed information obtained by the rotation speed information detection means;

a driving force calculation means for calculating a driving force of the vehicle based on axle shaft torque information of the vehicle; and a vehicle mass estimation means for estimating the mass of the vehicle as a regression coefficient when the rotation acceleration information and the driving force information are subjected to linear regression, wherein the vehicle mass estimation means calculates, with regard to an error between driving force information calculated based on the estimated mass and the rotation acceleration information and the driving force information calculated by the driving force calculation means, a ratio between the dispersion of the error obtained one time before and an error at the current moment; and wherein the vehicle mass estimation means calculates an update adjustment parameter by adding a stabilization parameter to thus obtained ratio, and uses the calculated update adjustment parameter to calculate a Kalman gain so that the mass is sequentially estimated so as to reduce an update width of the regression coefficient when the error ratio is higher.

In accordance with a second aspect of the present invention, there is provided a vehicle mass estimation method for estimating the mass of a vehicle based on rotation information of tires attached to the vehicle, comprising:

a rotation speed information detection step for periodically detecting tire rotation speed information of the respective wheels of the vehicle;

a rotation acceleration information calculation step for calculating tire rotation acceleration information based on the rotation speed information obtained in the rotation speed information detection step;

a driving force calculation step for calculating a driving force of the vehicle based on axle shaft torque information of the vehicle; and a vehicle mass estimation step for estimating the mass of the vehicle as a regression coefficient when the rotation acceleration information and the driving force information are subjected to linear regression, wherein the vehicle mass estimation step calculates, with regard to an error between driving force information calculated based on the estimated mass and the rotation acceleration information and the driving force information calculated in the driving force calculation step, a ratio between the dispersion of the error obtained one time before and an error at the current moment; and wherein the vehicle mass estimation step calculates an update adjustment parameter by adding a stabilization parameter to thus obtained ratio, and uses the calculated update adjustment parameter to calculate a Kalman gain so that the mass is sequentially estimated so as to reduce an update width of the regression coefficient when the error ratio is higher.

In accordance with a third aspect of the present invention, there is provided a vehicle mass estimation program which causes, in order to estimate the mass of a vehicle based on rotation information of tires attached to the vehicle, a computer to function as:

a rotation acceleration information calculation means for calculating tire rotation acceleration information based on the rotation speed information obtained by a rotation speed information detection means for periodically detecting tire rotation speed information of the respective wheels of the vehicle;

a driving force calculation means for calculating a driving force of the vehicle based on axle shaft torque information of the vehicle; and a vehicle mass estimation means for estimating the mass of the vehicle as a regression coefficient when the rotation acceleration information and the driving force information are subjected to linear regression, wherein the vehicle mass estimation means calculates, with regard to an error between driving force information calculated based on the estimated mass and the rotation acceleration information and the driving force information calculated by the driving force calculation means, a ratio between the dispersion of the error obtained one time before and an error at the current moment; and wherein the vehicle mass estimation means calculates an update adjustment parameter by adding a stabilization parameter to thus obtained ratio, and uses the calculated update adjustment parameter to calculate a Kalman gain so that the mass is sequentially estimated so as to reduce an update width of the regression coefficient when the error ratio is higher.

According to an apparatus, a method and a program for vehicle mass estimation of the present invention, when an observation value obtained at a certain time point significantly deviates from a value predicted from the current estimate parameter, an observation process is adjusted to have a larger dispersion so that the observation value is assumed as an outlier due to noise. This consequently causes the observation value to have a lower contribution level to the parameter update. Thus, the robustness to outliers can be improved to thereby estimate the mass of a running vehicle in a stable and accurate manner.

Advantageous Effects of Invention

According to an apparatus, a method, and a program for vehicle mass estimation of the present invention, the mass of a running vehicle can be estimated stably and accurately only based on a wheel speed signal.

DESCRIPTION OF EMBODIMENTS

The following section will describe embodiments of an apparatus, a method and a program for vehicle mass estimation of the present invention with reference to the attached drawings.

Figure 1:
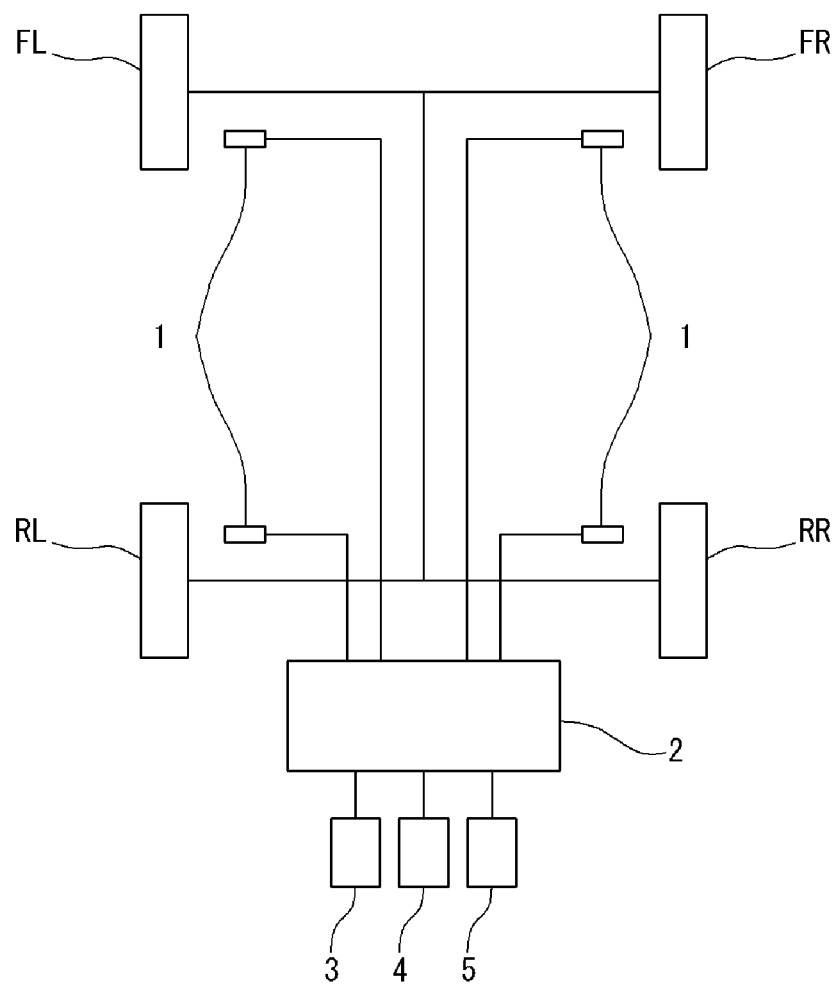
FIG. 1 is a block diagram illustrating one embodiment of a vehicle mass estimation apparatus of the present invention.

As shown in FIG. 1, the vehicle mass estimation apparatus according to one embodiment of the present invention includes, in order to detect the rotation speed information regarding four tires of left-front wheel (FL), right-front wheel (FR), left-rear wheel (RL), and right-rear wheel (RR) attached to the four-wheel vehicle, a normal wheel speed detection means (rotation speed information detection means) 1 that is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses, or an angular velocity sensor such as the one that generates power using rotation as in a dynamo to measure an angular velocity and a wheel speed based on the voltage. The output from the wheel speed detection means 1 is given to a control unit 2 that is a computer such as ABS.

The vehicle mass estimation apparatus of the present embodiment constitutes a part of a DLR-type TPMS which focuses on a change in dynamic loaded radius of a tire due to a decreased pressure. The control unit 2 is connected, for example, to a display unit 3 comprising a liquid crystal display element, a plasma display element or CRT for example for displaying a tire having a decreased pressure, an initialization button 4 that can be operated by a driver, and an alarm unit 5 for notifying a driver of a tire having a decreased pressure.

Figure 2:
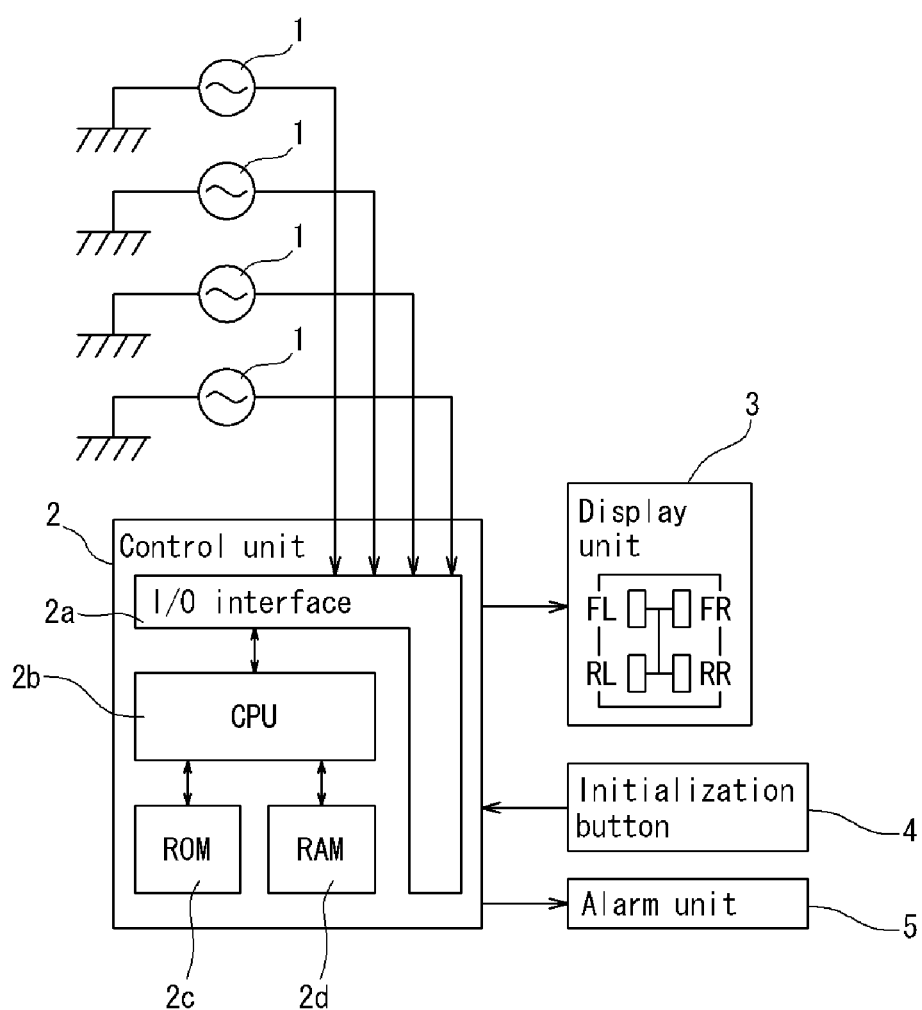
FIG. 2 is a block diagram illustrating the electrical configuration of the vehicle mass estimation apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d into which data is temporarily written when the CPU 2b performs a control operation or from which the written data is read.

The wheel speed detection means 1 outputs a pulse signal corresponding to the rotation number of a tire. The CPU 2b calculates, based on the pulse signal outputted from the wheel speed detection means 1, angular velocities of the respective tires. Based on the angular velocities, the tire rotation acceleration (rotation acceleration information) is calculated. The driving force F can be calculated by F=T/R based on the vehicle axle shaft torque T as CAN information and the tire load radius (initial set value) R.

The vehicle mass estimation apparatus according to the present embodiment comprises: the wheel speed detection means (rotation speed information detection means) 1; a rotation acceleration information calculation means for calculating tire rotation acceleration information based on the rotation speed information obtained by the rotation speed information detection means; a driving force calculation means for calculating a driving force of the vehicle based on axle shaft torque information of the vehicle; and a vehicle mass estimation means for estimating the mass of the vehicle as a regression coefficient when the rotation acceleration information and the driving force information are subjected to linear regression. The vehicle mass estimation means calculates, with regard to an error between driving force information calculated based on the estimated mass and the rotation acceleration information and the driving force information calculated by the driving force calculation means, a ratio between the dispersion of the error obtained one time before and an error at the current moment. An update adjustment parameter is calculated by adding a stabilization parameter to thus obtained ratio, and the calculated update adjustment parameter is used to calculate a Kalman gain so that the mass is sequentially estimated so as to reduce an update width of the regression coefficient when the error ratio is higher. The vehicle mass estimation program causes the control unit 2 to function as the rotation acceleration information calculation means, the driving force calculation means, and the vehicle mass estimation means.

In the present invention, based on the tire rotation acceleration a calculated based on the rotation speed information obtained by the wheel speed detection means 1 and the vehicle driving force F calculated based on the axle shaft torque information of the vehicle, the regression coefficient representing the vehicle mass m is calculated based on the relation of the motion equation $F=ma$ by using the robust Kalman filter disclosed in Non-Patent Literature 1 instead of a conventional Kalman filter (iterative least squares technique). According to an algorithm disclosed in the literature, when an observation value obtained at the current time point significantly deviates from a value predicted from the current estimation parameter, an observation process is adjusted by a dispersion adjustment parameter to have a larger dispersion so that the observation value can be assumed as an outlier due to noise. This consequently causes the observation value to have a lower contribution level to the parameter update. In this way, by incorporating the previous knowledge derived from the gamma distribution into the general calculation of a Kalman gain by a Kalman filter, the robustness to outliers can be improved.

However, the present invention does not directly use this method. The reason is that, since the method disclosed in Non-Patent Literature 1 is a general method for status estimation, an application of this method to the present invention as a sequential estimation method of a linear regression parameter requires a special modification in order to achieve a desired performance. The wording "special modification" herein means that assumed status transition model and status transition noise are not considered and the model itself is not learned (because a regression parameter desired to be estimated does not change, and the model regarding a status transition and the learning thereof are not required) and thus a ratio between the dispersion of the error obtained one time before and an error at the current moment is calculated at every time and is used to calculate the dispersion adjustment parameter.

In the present invention, the vehicle acceleration a and the signals of the torques F applied to the respective wheels are acquired from the wheel speed detection means (rotation speed information detection means) 1 provided in the ABS. Then, based on the relation of the motion equation F=m'×a, the mass m is obtained as a regression coefficient when linear regression is performed. In the formula, m=(m, b)' and a=(a, 1)' represent a vertical vector and b represents a regression intercept. The regression parameter $\overline{m}$ to be calculated is based on a general sequential update formula, i.e. the following formula (1).

$$m_{k+1} = m_k + K_k(F_k - m'_k a_k) \quad (1)$$

In the formula, the index k represents the kth data or the kth estimation value. Here, the calculation of Kk corresponding to the Kalman gain becomes problematic. In the present invention, as in the above Non-Patent Literature 1, Kk is calculated as in the following formula (2).

$$K_k = \sum_{k-1}^{-1} a_k \left( a'_k \sum_{k-1}^{-1} a_k + \frac{1}{W_k} R \right)^{-1} \quad (2)$$

In the formula, Σ represents the covariance matrix of the input a and R represents a unit matrix. The calculation of the update adjustment parameter $w_k$ in the formula (2) is significantly different from the calculation in the Non-Patent Literature 1. The present invention considers the confidence interval of the parameter $\overline{m}$ to be estimated and calculates the update adjustment parameter $w_k$ as shown in the following formula (3).

$$W_k = \frac{\alpha + 0.5}{\beta + \frac{(F_k - m'_k a_k)^2}{\xi_{k-1}}} \quad (3)$$

In the formula, α and β represent an arbitrary stable parameter. The following formula is established.

$$\xi_k = \frac{1 + a'_k \sum_{k-1}^{-1} a_k}{k-1} \sum_{i=1}^{k} (F_i - m'_i a_i)^2$$

In the present invention, when the observation $(a_k, F_k)$ obtained at the current time cannot be explained by the estimation model mk, that is, when the incorporation of the data into the model causes an increased confidence interval of the estimation value, $K_k$ is proportionally reduced. This consequently causes the data to have a lower contribution to the update of the estimation value, thus enabling the update of the parameter in a robust manner. Thus, the performance of the conventional mass estimation technique can be significantly improved. The present invention is the same as the conventional method in using an approach with which a model error is considered and an impact by the data on the parameter update is adjusted. However, in order to improve the accuracy of the vehicle mass estimation, the present invention uses a new method of calculating an adjustment parameter from the confidence interval of the regression parameter, thus providing a new effect not predicted by those skilled in the art.

Example and Comparative Example

A comparison was made by an actual vehicle running experiment between the case where the vehicle mass is estimated based on the method of the present invention and the case where the vehicle mass is estimated based on the conventional method (iterative least squares technique). In the experiment, a front-wheel-drive vehicle was used, that had an actual mass of about 1800 kg (one passenger). The wheel speed and the vehicle axle shaft torque signal were sampled with a cycle of 50 milliseconds. The parameters α and β used to calculate w were both set to 1.

Figure 3:
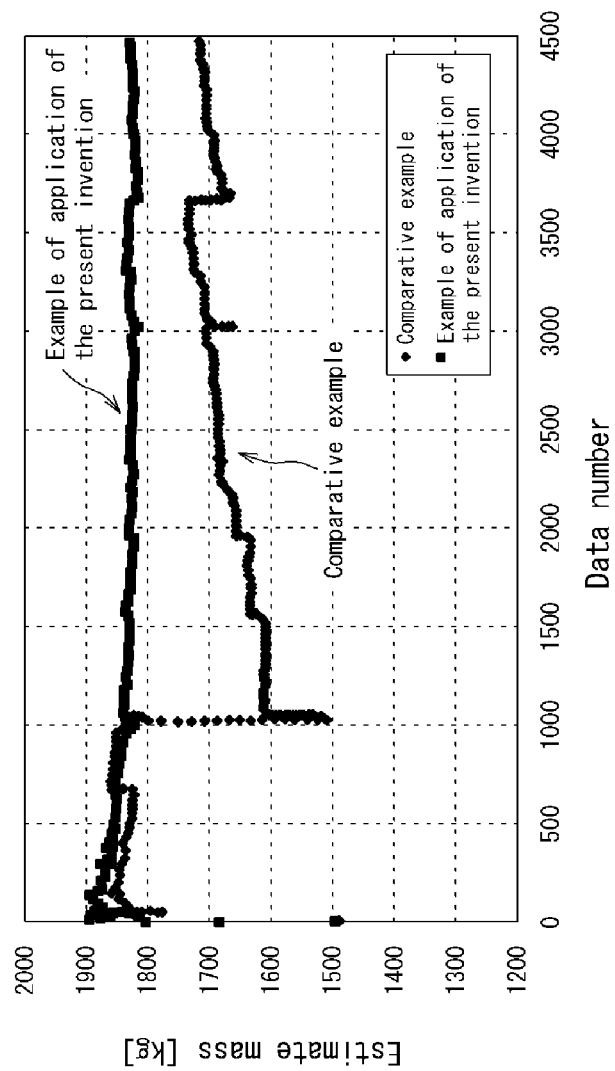
FIG. 3 illustrates the comparison between the result of the estimation based on the present invention and the result of the estimation based on a conventional method.
Figure 4:
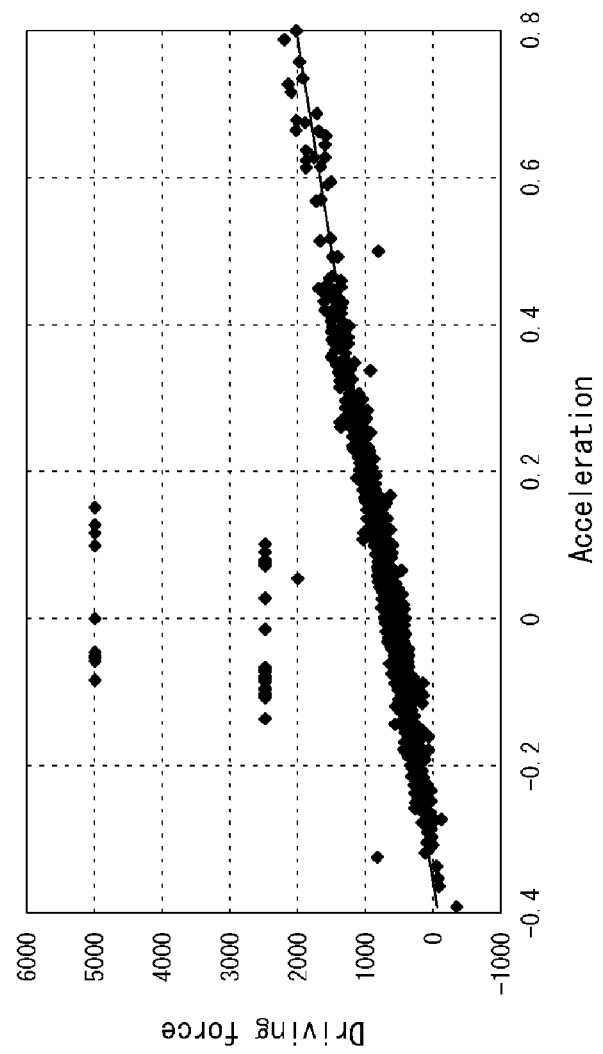
FIG. 4 illustrates the relation between the vehicle acceleration and the driving force in an actual vehicle experiment.

FIG. 3 shows the comparison between the result of the estimation based on the method of the present invention and the result of the estimation based on the conventional method. The conventional method shows a significantly-deteriorated estimation accuracy around the $1000^{th}$ data. The reason is presumably that an outlier is caused in the driving force due to some reason to thereby have an influence on the estimation value (see FIG. 4). According to the present invention, the contribution by such an outlier to the parameter update can be lowered. Thus, the unstable estimation as described above can be avoided and the mass can be estimated in a stable and accurate manner.

What is claimed is:

1. A vehicle mass estimation apparatus for estimating the mass of a vehicle based on rotation information of tires attached to the vehicle, comprising:
    a rotation speed information detection means for periodically detecting tire rotation speed information of the respective wheels of the vehicle;
    a rotation acceleration information calculation means for calculating tire rotation acceleration information based on the rotation speed information obtained by the rotation speed information detection means;
    a driving force calculation means for calculating a driving force of the vehicle based on axle shaft torque information of the vehicle; and
    a vehicle mass estimation means for estimating the mass of the vehicle as a regression coefficient when the rotation acceleration information and the driving force information are subjected to linear regression,
    wherein the vehicle mass estimation means calculates, with regard to an error between driving force information calculated based on the estimated mass and the rotation acceleration information and the driving force information calculated by the driving force calculation means, a ratio between the dispersion of the error obtained one time before and an error at the current moment; and
    wherein the vehicle mass estimation means calculates an update adjustment parameter by adding a stabilization parameter to the thus obtained ratio, and uses the calculated update adjustment parameter to calculate a Kalman gain so that the mass is sequentially estimated so as to reduce an update width of the regression coefficient when the error ratio is higher.

2. A vehicle mass estimation method for estimating the mass of a vehicle based on rotation information of tires attached to the vehicle, comprising:
    a rotation speed information detection step, effected by a computer, for periodically detecting tire rotation speed information of the respective wheels of the vehicle;
    a rotation acceleration information calculation step, effected by the computer, for calculating tire rotation acceleration information based on the rotation speed information obtained in the rotation speed information detection step;
    a driving force calculation step, effected by the computer, for calculating a driving force of the vehicle based on axle shaft torque information of the vehicle; and a vehicle mass estimation step, effected by the computer, for estimating the mass of the vehicle as a regression coefficient when the rotation acceleration information and the driving force information are subjected to linear regression, wherein the vehicle mass estimation step calculates, with regard to an error between driving force information calculated based on the estimated mass and the rotation acceleration information and the driving force information calculated in the driving force calculation step, a ratio between the dispersion of the error obtained one time before and an error at the current moment; and wherein the vehicle mass estimation step calculates an update adjustment parameter by adding a stabilization parameter to the thus obtained ratio, and uses the calculated update adjustment parameter to calculate a Kalman gain so that the mass is sequentially estimated so as to reduce an update width of the regression coefficient when the error ratio is higher.

3. A vehicle mass estimation program, carried on non-transitory storage media, for estimating the mass of a vehicle based on rotation information of tires attached to the vehicle, the program, when executed, causing a computer to function as:

a rotation acceleration information calculation means for calculating tire rotation acceleration information based on the rotation speed information obtained by a rotation speed information detection means for periodically detecting tire rotation speed information of the respective wheels of the vehicle;

a driving force calculation means for calculating a driving force of the vehicle based on axle shaft torque information of the vehicle; and a vehicle mass estimation means for estimating the mass of the vehicle as a regression coefficient when the rotation acceleration information and the driving force information are subjected to linear regression, wherein the vehicle mass estimation means calculates, with regard to an error between driving force information calculated based on the estimated mass and the rotation acceleration information and the driving force information calculated by the driving force calculation means, a ratio between the dispersion of the error obtained one time before and an error at the current moment; and wherein the vehicle mass estimation means calculates an update adjustment parameter by adding a stabilization parameter to the thus obtained ratio, and uses the calculated update adjustment parameter to calculate a Kalman gain so that the mass is sequentially estimated so as to reduce an update width of the regression coefficient when the error ratio is higher.

* * * * *